(12) United States Patent
Chimura et al.

(10) Patent No.: US 10,617,125 B2
(45) Date of Patent: Apr. 14, 2020

(54) CLAMPING DEVICE FOR BONE-IN LIMB MEAT, LOADING DEVICE FOR BONE-IN LIMB MEAT, AND CLAMPING METHOD FOR BONE-IN LIMB MEAT

(71) Applicant: MAYEKAWA MFG. CO., LTD., Tokyo (JP)

(72) Inventors: Takeshi Chimura, Tokyo (JP); Hiroyuki Usui, Tokyo (JP); Takekuni Umehara, Tokyo (JP); Osamu Goto, Tokyo (JP); Yuuichi Kuratani, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 16/463,108

(22) PCT Filed: Oct. 5, 2018

(86) PCT No.: PCT/JP2018/037388
§ 371 (c)(1),
(2) Date: May 22, 2019

(87) PCT Pub. No.: WO2019/070058
PCT Pub. Date: Apr. 11, 2019

(65) Prior Publication Data
US 2019/0373904 A1    Dec. 12, 2019

(30) Foreign Application Priority Data
Oct. 6, 2017    (JP) .................................. 2017-195873

(51) Int. Cl.
*A22B 7/00*    (2006.01)
*A22C 17/00*   (2006.01)
(Continued)

(52) U.S. Cl.
CPC .............. *A22B 7/003* (2013.01); *A22C 17/00* (2013.01); *A22C 15/00* (2013.01); *A22C 21/0007* (2013.01); *A22C 21/0053* (2013.01)

(58) Field of Classification Search
CPC .............................................. A22B 7/001–004
(Continued)

(56) References Cited

U.S. PATENT DOCUMENTS 3,376,600 A      4/1968   Shadley
6,277,021 B1 *   8/2001   Meyn ................. A22C 21/0007
                                                        452/182
(Continued)

FOREIGN PATENT DOCUMENTS

EP    2277382 A1      1/2011
JP    2001149001 A    6/2001
(Continued)

OTHER PUBLICATIONS

International Search Report issued in Intl. Appln. No. PCT/JP2018/037378 dated Nov. 13, 2018. English translation provided.
(Continued)

*Primary Examiner* — Richard T Price, Jr.
(74) *Attorney, Agent, or Firm* — Rossi, Kimms & McDowell LLP

(57) ABSTRACT

A clamping device for a bone-in limb meat according to an embodiment includes a base portion, a pair of clamp pieces mounted to the base portion and configured to hold a bone-in limb meat, and an orientation adjusting member for adjusting an orientation of the bone-in limb meat, the orientation adjusting member being mounted to the base portion independently of the pair of clamp pieces and having an inclined surface inclined at an acute angle with respect to a center line between the pair of clamp pieces. When the pair of clamp pieces are in an opened state, in a planar view, at least
(Continued)

a part of the inclined surface of the orientation adjusting member is disposed so as to overlap a space formed between the pair of clamp pieces.

15 Claims, 9 Drawing Sheets

(51) Int. Cl.
*A22C 15/00* (2006.01)
*A22C 21/00* (2006.01)

(58) Field of Classification Search
USPC .............................. 452/177–180, 182, 183
See application file for complete search history.

(56) References Cited

U.S. PATENT DOCUMENTS

| | | | |
|---|---|---|---|
| 7,404,759 | B2 | 7/2008 | Sato |
| 9,451,779 | B2 | 9/2016 | Hattori et al. |
| 2012/0231715 | A1 | 9/2012 | Kodama et al. |
| 2012/0315834 | A1* | 12/2012 | Van Der Steen ...... A22B 5/007 452/125 |

FOREIGN PATENT DOCUMENTS

| | | |
|---|---|---|
| JP | 2005304314 A | 11/2005 |
| JP | 2013507101 A | 3/2013 |
| WO | 2008136513 A1 | 11/2008 |
| WO | 2009139031 A1 | 11/2009 |
| WO | 2014064773 A1 | 5/2014 |

OTHER PUBLICATIONS

Written Opinion issued in Intl. Appln. No. PCT/JP2018/037378 dated Nov. 13, 2018.
International Search Report issued in Intl. Appln. No. PCT/JP2018/037388 dated Nov. 13, 2018. English translation provided.
Written Opinion issued in Intl. Appln. No. PCT/JP2018/037388 dated Nov. 13, 2018.
International Search Report issued in Intl. Appln. No. PCT/JP2018/037391 dated Nov. 13, 2018. English translation provided.
Written Opinion issued in Intl. Appln. No. PCT/JP2018/037391 dated Nov. 13, 2018.
Copending U.S. Appl. No. 16/463,082, filed May 22, 2019.
Copending U.S. Appl. No. 16/463,098, filed May 22, 2019.
Copending U.S. Appl. No. 16/463,132, filed May 22, 2019.

* cited by examiner

CLAMPING DEVICE FOR BONE-IN LIMB MEAT, LOADING DEVICE FOR BONE-IN LIMB MEAT, AND CLAMPING METHOD FOR BONE-IN LIMB MEAT

TECHNICAL FIELD

The present disclosure relates to a clamping device for a bone-in limb meat, a loading device for the bone-in limb meat, and a clamping method for the bone-in limb meat.

BACKGROUND

In order to save labor, a process of slaughtering an edible chicken carcass undergoes transition from manual processing to automatic processing by a machine.

Patent Document 1 discloses an automatic deboner which performs a process of deboning a bone-in thigh meat. This deboner intermittently conveys the bone-in thigh meat between a plurality of processing stations while suspending it with a clamping device, and sequentially performs steps of cutting a meat of the bone-in thigh meat, separating bone and meat, and the like in the respective stations, to enable automatic deboning.

Patent Document 2 discloses a clamping device which holds a bone-in thigh meat conveyed by a conveyor by a multi-axes articulated arm and suspends it to a hanger.

CITATION LIST

Patent Literature

Patent Document 1: JP2013-507101(translation of a PCT application) Patent Document 2: WO2009/139031A

SUMMARY

Technical Problem

When loading bone-in limb meats to an automatic deboner, it is necessary to load a plurality of bone-in limb meats in the same direction so that a processing step for the plurality of bone-in limb meats can be performed uniformly. At present, however, it is difficult to automate this work by a machine, so it is necessary for person to support to do this work.

Neither Patent Document 1 nor Patent Document 2 discloses a means for automating a work to load a plurality of bone-in limb meats to an automatic deboner or the like in the same direction.

An object of one embodiment is to automate, by a machine without manpower, a work to load a plurality of bone-in limb meats in the same direction when loading the bone-in limb meats to a processing device such as a deboner.

Solution to Problem (1) A clamping device for a bone-in limb meat according to an embodiment includes a base portion, a pair of clamp pieces mounted to the base portion and configured to hold a bone-in limb meat, and an orientation adjusting member for adjusting an orientation of the bone-in limb meat, the orientation adjusting member being mounted to the base portion independently of the pair of clamp pieces and having an inclined surface inclined at an acute angle with respect to a center line between the pair of clamp pieces. When the pair of clamp pieces are an opened state, in a planar view, at least a part of the inclined surface of the orientation adjusting member is disposed so as to overlap a space formed between the pair of clamp pieces.

In the present description, the "planar view" refers to viewing from a direction perpendicular to the center line between the above pair of clamp pieces and a direction in which the pair of clamp pieces are opened/closed.

In the above configuration (1), when the pair of clamp pieces are in the opened state, in the planar view, at least the part of the inclined surface of the above orientation adjusting member is disposed so as to overlap a space formed between the pair of clamp pieces. Therefore, when the pair of clamp pieces start to close, the inclined surface of the orientation adjusting member first contacts the bone-in limb meat.

When the pair of clamp pieces hold the bone-in limb meat, thereby raising a part of the bone-in limb meat, positional displacement occurs, in the planar view, between the gravity center of the bone-in limb meat and the center of a held section of the bone-in limb meat held by the pair of clamp pieces.

Owing to this positional displacement, when the bone-in limb meat is pulled up from a surface where the bone-in limb meat is placed, the gravity center of the bone-in limb meat shifts to the outside of the held section. As a result, a rotational moment is generated, by which the held section of the bone-in limb meat heads to the back of the pair of clamp pieces with the inclined surface of the orientation adjusting member as the center. The bone-in limb meat is held by the clamp pieces in a direction in which the gravity center of the bone-in limb meat is positioned outside of the held section by this rotational moment. Therefore, a plurality of bone-in limb meats are sequentially held by the pair of clamp pieces, making it possible to load the plurality of bone-in limb meats to a processing portion such as a deboner all in the same direction.

In an embodiment, at the time of a closing operation of the clamp pieces, a space is formed, the space being capable of loosely fitting the bone-in limb meat inside the pair of clamp pieces. As a result, a rotational operation of the bone-in limb meat by the above rotational moment is allowed in the space.

(2) In an embodiment, in the above configuration (1), when the pair of clamp pieces are in a closed state, in the planar view, the orientation adjusting member has a restraint surface present at a position overlapping the space between the pair of clamp pieces and capable of restraining the bone-in limb meat, the space is divided into a first space and a second space by the center line, the first space being positioned on a side of the orientation adjusting member, and the second space being at a position farther away from the orientation adjusting member than the first space, and the restraint surface exists at a position overlapping the first space in the planar view.

With the above configuration (2), when the pair of clamp pieces are in the closed state, the above restraint surface can prevent the bone-in limb meat from dropping off the clamp pieces, making it possible to maintain a holding state by the pair of clamp pieces.

(3) In an embodiment, in the above configuration (1) or (2), an inner surface of a clamp piece of the pair of clamp pieces at a position away from the orientation adjusting member forms a concave surface, the inner surface facing the bone-in limb meat.

With the above configuration (3), the inner surface of the clamp piece at the position away from the orientation adjusting member forms the concave surface, the inner surface facing the bone-in limb meat, allowing the bone-in limb meat to smoothly perform the rotational operation while being guided by the concave surface when the bone-in limb meat is rotated.

(4) In an embodiment, in any one of the above configurations (1) to (3), tip portions of the pair of clamp pieces respectively have inner surfaces facing each other across the space, and when the pair of clamp pieces are in a closed state, the inner surfaces of the pair of clamp pieces incline with respect to the center line such that a distance between the inner surfaces of the clamp pieces decreases toward tip sides of the clamp pieces.

With the above configuration (4), the tip portions of the pair of clamp pieces have the above configuration, making it easier to insert the tip portions of the pair of clamp pieces under the bone-in limb meat at the time the closing operation.

In addition, positional displacement occurs, in the planar view, between the center of the held section of the bone-in limb meat and the gravity center of the bone-in limb meat when the tip portions of the pair of clamp pieces are inserted under the bone-in limb meat, thereby raising the part of the bone-in limb meat, and the above rotational moment can be generated when the bone-in limb meat is pulled up from the surface where the bone-in limb meat is placed.

(5) In an embodiment, in any one of the above configurations (1) to (4), the orientation adjusting member is rotatably supported to the base portion in an opening/closing direction of the pair of clamp pieces, and the clamping device includes a drive portion capable of rotating the orientation adjusting member.

With the above configuration (5), the orientation adjusting member can adjust the opening/closing direction of the clamp pieces, making it possible to adjust a timing at which the inclined surface of the orientation adjusting member contacts the bone-in limb meat when the pair of clamp pieces perform the closing operation.

(6) In an embodiment, in any one of the above configurations (1) to (5), the inclined surface of the orientation adjusting member is configured to be positioned above the pair of clamp pieces when the pair of clamp pieces are holding the bone-in limb meat.

The gravity center of the bone-in limb meat positioned below a holding position by the pair of clamp pieces is generally positioned in a meat part.

Therefore, the inclined surface of the orientation adjusting member is positioned above the pair of clamp pieces, making it possible to bring the inclined surface into contact with a bone part of the bone-in limb meat. It is possible to securely generate the above rotational moment about the inclined surface by bringing the inclined surface into contact with a hard bone part.

(7) A loading device for a bone-in limb meat for loading the bone-in limb meat to a processing portion, the loading device according to an embodiment includes the clamping device for the bone-in limb meat according to any one of the above configurations (1) to (6), and an arm supporting the base portion, and capable of controlling a position and orientation of the base portion. The loading device loads, to the processing portion, the bone-in limb meat held by the clamping device.

With the above configuration (7), the above arm can control the position and orientation of the base portion, making it possible to move the clamping device in accordance with the bone-in limb meat at an arbitrary position and orientation, and hold the bone-in limb meat by the clamping device.

In addition, with the above clamping device, as described above, the plurality of bone-in limb meats sequentially held by the above clamping device are all held in the same direction. It is therefore possible to load the plurality of bone-in limb meats sequentially held by the clamping device to the processing portion in the same direction.

(8) In an embodiment, in the above configuration (7), the loading device for the bone-in limb meat further includes a conveyor conveying the bone-in limb meat to the clamping device, a determination portion capable of acquiring orientation information of the bone-in limb meat conveyed by the conveyor, and a control portion operating the arm based on the orientation information obtained by the determination portion and loading the bone-in limb meat to the processing portion in a predetermined direction.

With the above configuration (8), the above control portion operates the clamping device and the arm based on the orientation information obtained by the above determination portion, making it possible to securely hold the bone-in limb meat sent at the arbitrary position and orientation on the conveyor and load the bone-in limb meat held by the clamping device to the processing portion in the predetermined direction.

It is also possible to continuously load the plurality of bone-in limb meats conveyed by the conveyor to the processing portion, and thus to increase a speed at which the bone-in limb meats are loaded to the processing portion and cope with a deboner having a high processing speed. In addition, an orientation controlling member holds the bone-in limb meat in a predetermined direction when the clamping device holds the bone-in limb meat, making it possible to suppress a moving amount of the arm. It is therefore possible to dispose a plurality of loading devices side by side, and thus to cope with an increasing processing speed.

(9) In an embodiment, in the above configuration (8), the bone-in limb meat is a bone-in thigh meat, and the orientation information includes front/back surface information indicating whether an upper surface of the bone-in limb meat placed on the conveyor is a front surface or a back surface, the orientation adjusting member is rotatably supported to the base portion in an opening/closing direction of the pair of clamp pieces, the clamping device includes a drive portion capable of rotating the orientation adjusting member, and the control portion is configured to control, based on the front/back surface information, the drive portion such that the inclined surface is positioned on a same side as a gravity center of the bone-in limb meat with respect to a center of a held section of the bone-in limb meat when the pair of clamp pieces hold the bone-in limb meat.

With the above configuration (9), when the pair of clamp pieces hold the bone-in limb meat, the control portion performs control such that the inclined surface of the orientation adjusting member is positioned on the same side as the gravity center of the bone-in limb meat with respect to the center of the held section of the bone-in limb meat, making it possible to securely generate the above rotational moment even if the bone-in limb meat is randomly placed on the conveyor, and the upper surface of the bone-in limb meat is the front surface or the back surface.

The direction of the above rotational moment is set in a direction in which the gravity-center of the bone-in limb meat always rotates to a side closer to the tip sides of the clamp pieces than the held section of the pair of clamp pieces. Therefore, the clamping device can always hold the plurality of bone-in limb meats in the same direction, making it possible to load the plurality of bone-in limb meats to the processing portion in the same direction.

(10) In an embodiment, in the above configuration (9), the orientation adjusting member includes a mounting portion mounted to the arm, and a pair of extension portions extending while being forked from the mounting portion and each having the inclined surface, and the control portion is configured to dispose a first extension portion of the pair of extension portions such that the first extension portion touches the bone-in limb meat when the upper surface of the bone-in limb meat placed on the conveyor is the front surface and dispose a second extension portion of the pair of extension portions such that the second extension portion touches the bone-in limb meat when the upper surface of the bone-in limb meat is the back surface.

With the above configuration (10), based on the above front/back surface information, one of the inclined surfaces of the above pair of extension portions is selectively brought into contact with the bone-in limb meat, making it possible to always bring the above inclined surface into contact with the bone-in limb meat on the same side as the gravity center of the bone-in limb meat with respect to the held section of the bone-in limb meat.

Consequently, it is possible to securely generate rotational moments in the same direction in the plurality of bone-in limb meats sequentially held by the clamp pieces.

(11) A clamping method for clamping a bone-in limb meat by using a clamping device, the clamping device including a base portion, a pair of clamp pieces mounted to the base portion, and an orientation adjusting member mounted to the base portion independently of the pair of clamp pieces and having an inclined surface inclined at an acute angle with respect to a center line between the pair of clamp pieces, the clamping method according to an embodiment includes a holding step of holding the bone-in limb meat by closing the pair of clamp pieces, and a rotating step of bringing the inclined surface of the orientation adjusting member into contact with the bone-in limb meat and rotating, about the inclined surface, a held section of the bone-in limb meat held by the pair of clamp pieces to a back of the pair of clamp pieces during an closing operation of the pair of clamp pieces.

With the above method (11), in the above rotating step, during the closing operation of the pair of clamp pieces, the inclined surface of the orientation adjusting member is brought into contact with the bone-in limb meat before the pair of clamp pieces, and the bone-in limb meat is rotated, about the inclined surface, to the back of the pair of clamp pieces, and thus the plurality of bone-in limb meats sequentially held by the clamping device are always rotated and held in the same direction. It is therefore possible to load the plurality of bone-in limb meats to the processing portion in the same direction by sequentially holding the plurality of bone-in limb meats by the clamping device.

(12) In an embodiment, in the above method (11), the clamping method for the bone-in limb meat further includes a restraining step of restraining the bone-in limb meat by disposing a part of the orientation adjusting member so as to overlap a space formed between the pair of clamp pieces in a planar view after the pair of clamp pieces are closed.

With the above method (12), after the pair of clamp pieces are closed, the bone-in limb meat is restrained at the holding position by the part of the orientation adjusting member. Thus it is possible to prevent the bone-in limb meat from dropping off the clamp pieces and maintain a holding state by the clamp pieces.

(13) In an embodiment, in the above method (11) or (12), in the rotating step, the inclined surface of the orientation adjusting member is brought into contact with the bone-in limb meat on a same side as a gravity center of the bone-in limb meat with respect to a center of a held section of the bone-in limb meat held by the pair of clamp pieces.

With the above method (13), the inclined surface of the orientation adjusting member is positioned on the same side as the gravity center of the bone-in limb meat with respect to the center of a section of the bone-in limb meat held by the pair of clamp pieces, making it possible to securely generate the above rotational moment.

Moreover, the above rotational moment is generated in a direction such that the gravity center of the bone-in limb meat always rotates to a side closer to tips of the clamp pieces than the holding position of the pair of clamp pieces. Thus it is possible to always hold the plurality of bone-in limb meats in the same direction and to load the plurality of bone-in limb meats to the processing portion in the same direction.

(14) In an embodiment, in any one of the above methods (11) to (13), in the rotating step, when the pair of clamp pieces perform the closing operation, a part of the bone-in limb meat is raised by the pair of clamp pieces so that positional displacement occurs between the gravity center of the bone-in limb meat and the center of the held section of the bone-in limb meat held by the pair of clamp pieces, and a rotational moment toward the back of the pair of clamp pieces about the inclined surface is generated in the bone-in limb meat.

With the above method (14), the rotational moment toward the back of the pair of clamp pieces about the inclined surface is generated in the bone-in limb meat, making it possible to always hold the bone-in limb meat in the same direction.

(15) In an embodiment, in any one of the above methods (11) to (14), the bone-in limb meat is a bone-in thigh meat, and in the rotating step, the inclined surface of the orientation adjusting member is brought into contact with the bone-in thigh meat at a position between a limb neck and the held section.

With the above method (15), if the bone-in limb meat is the bone-in thigh meat, it is possible to bring the inclined surface of the orientation adjusting member into contact with a hard section on a limb neck side of the bone-in thigh meat, making it possible to securely generate the above rotational moment about the inclined surface.

Advantageous Effects

According to an embodiment, when loading a bone-in limb meat to a processing device such as a deboner, automatic loading becomes possible in which bone-in limb meats are aligned in direction without manpower, allowing labor saving.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
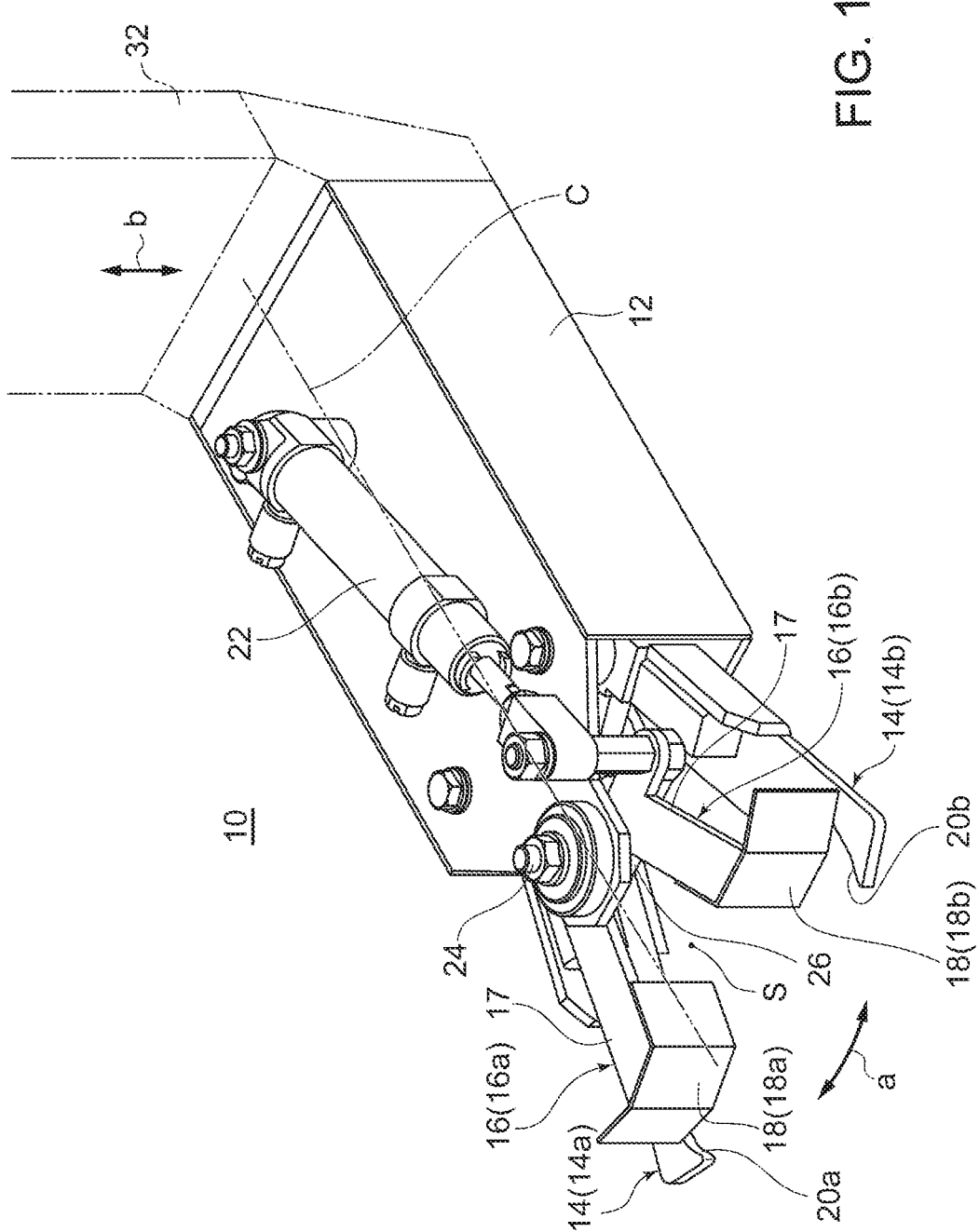
FIG. 1 is a perspective view of a clamping device according to an embodiment.
Figure 2:
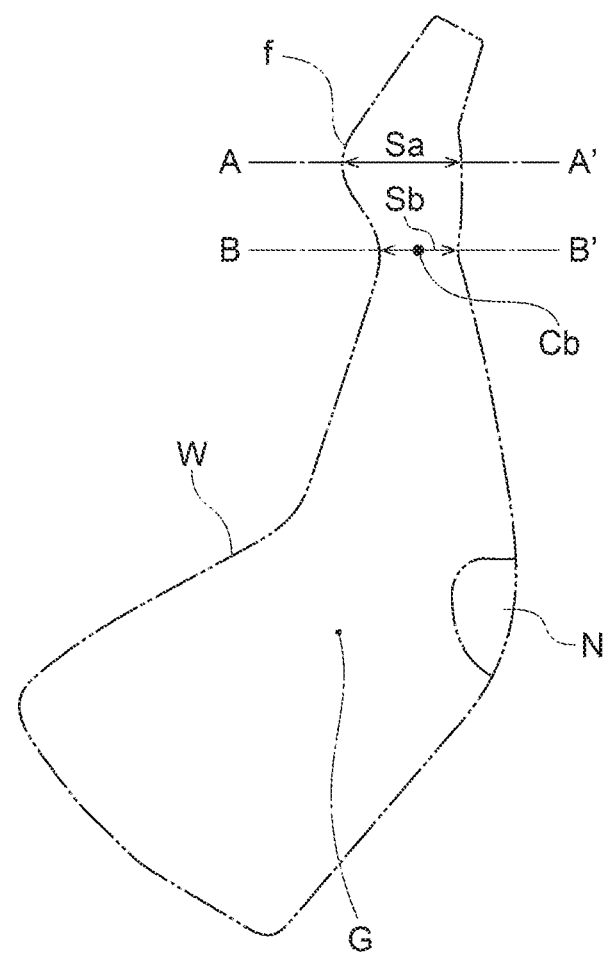
FIG. 2 is a full view of a bone-in thigh meat.
Figure 3A:
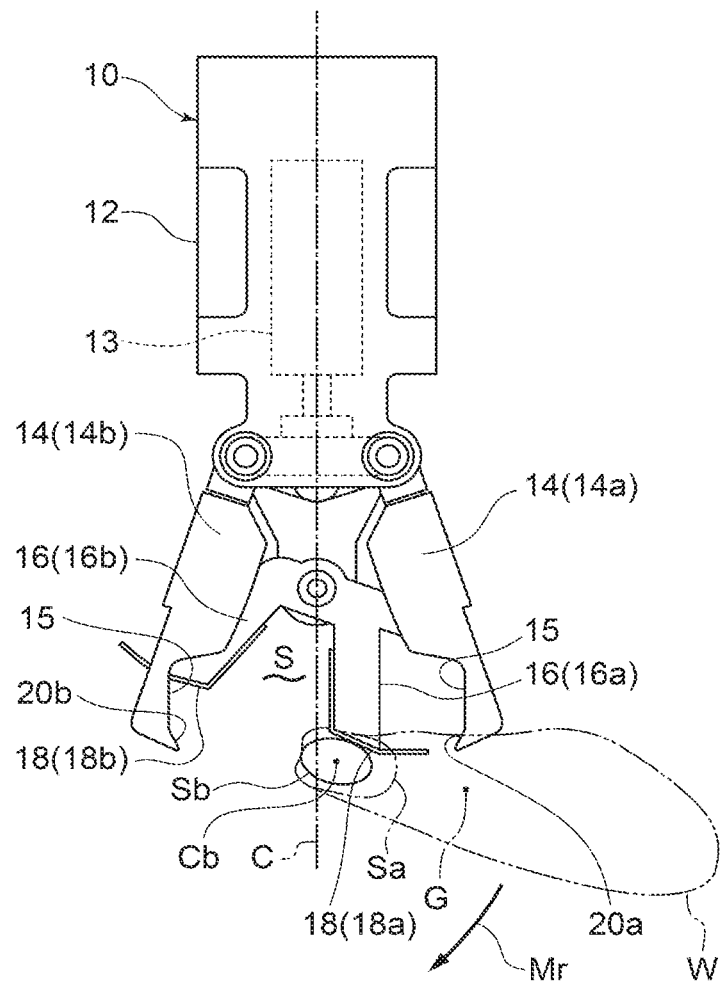
FIG. 3A is a bottom view showing an opened state of the clamping device according to an embodiment.
Figure 3B:
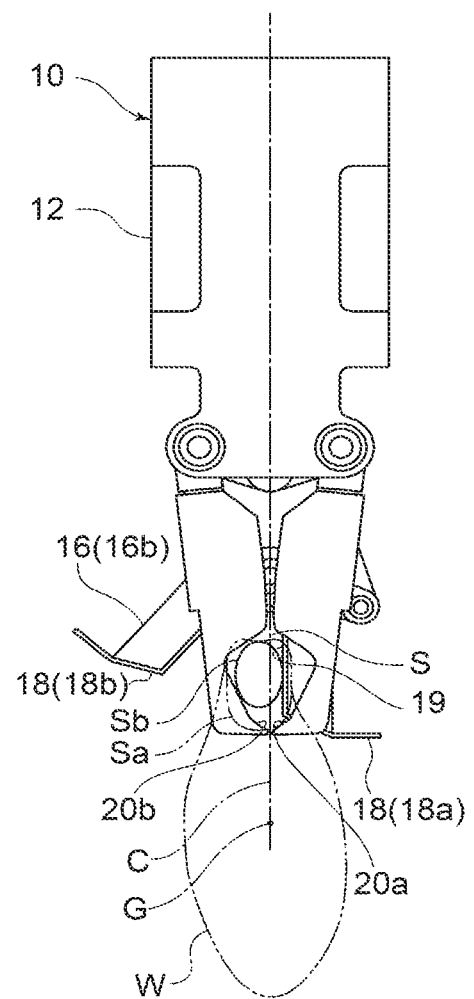
FIG. 3B is a bottom view showing a closed state of the clamping device according to an embodiment.

FIG. 1 shows a clamping device 10 for a bone-in limb meat according to an embodiment. FIG. 2 shows a contact position A-A' of a limb neck part fat which inclined surfaces 18 of orientation adjusting members 16 to be described later contact, and a holding position B-B' held by the clamping device 10 if a bone-in limb meat W is a bone-in thigh meat of poultry or the like. Reference character N denotes a knee part as a joint part between a thighbone and a lower leg bone when the bone-in limb meat W is a bone-in thigh meat. FIG. 3A shows a state in which a pair of clamp pieces 14 are in an opened state, and FIG. 3B shows a state in which the pair of clamp pieces 14 are set in a closed state. In the figures, reference character Sa denotes a cross section of the bone-in limb meat W at the contact position A-A' shown in FIG. 2, and reference character Sb denotes a cross section of the bone-in limb meat W at the holding position B-B'.

As shown in FIG. 1, the pair of clamp pieces 14 (14a and 14b) and the orientation adjusting members 16 (16a and 16b) are mounted to a base portion 12. The pair of clamp pieces are configured to be opened/closed in the direction of an arrow "a", thereby being able to hold the bone-in limb meat W. The orientation adjusting members 16 are mounted to the base portion 12 independently of the clamp pieces. The orientation adjusting members 16 have the inclined surfaces 18 (18a and 18b) each inclined at an acute angle with respect to a center line C between the pair of clamp pieces.

Figure 6A:
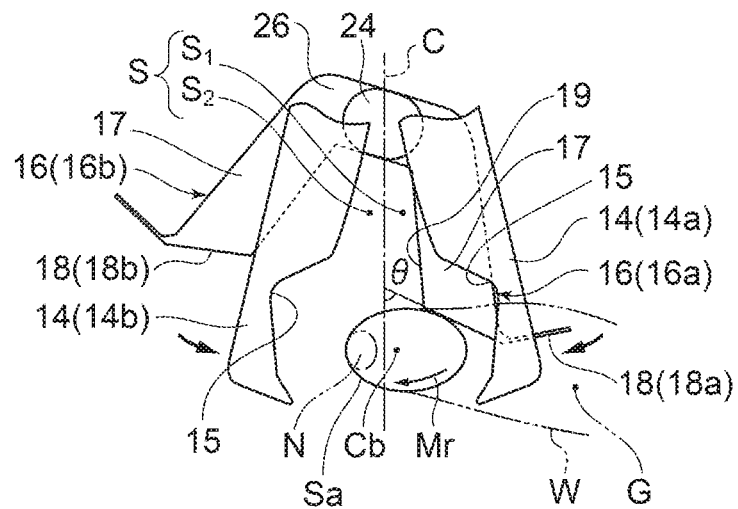
FIG. 6A is an operation explanatory diagram showing a state after the start of a closing operation of the clamping device according to an embodiment.

That is, as shown in FIG. 6A, an angle θ forms an acute angle, the angle θ being formed between each inclined surface 18 and a segment toward a tip side of a corresponding one of the clamp pieces from an intersection between the center line C and an extension line of the inclined surface 18. When the pair of clamp pieces are in the opened state, in a planar view, at least a part of the inclined surfaces 18 are disposed so as to overlap a space S formed between the pair of clamp pieces.

The "planar view" refers to viewing from a direction (the direction of an arrow b in FIG. 1) perpendicular to the center line C between the pair of clamp pieces and a direction (the direction of the arrow "a" in FIG. 1) in which the pair of clamp pieces are opened/closed.

In FIGS. 3A and 3B, reference character Cb denotes a center of the cross section Sb (to be also referred to as a "holding center" hereinafter). When the bone-in limb meat W is completely suspended by the clamping device 10, that is, when the bone-in limb meat W is drawn away from a surface on which the bone-in limb meat W is placed when held (to be also referred to as a "holding surface" hereinafter), the holding center Cb and a gravity center G of the bone-in limb meat W match in the planar view. In an embodiment, a conveyance surface of a conveyor 34 to be described later is the holding surface.

In the above configuration, as shown in FIG. 3A, when holding the bone-in limb meat W by the clamping device 10, the inclined surfaces 18 of the orientation adjusting members 16 contact the bone-in limb meat W before the clamp pieces 14 (14a and 14b). Subsequently, when a part of the bone-in limb meat W is raised by the pair of clamp pieces 14, and another section is on the holding surface, positional displacement exists, in the planar view, between the holding center Cb and the gravity center G of the bone-in limb meat W.

Owing to this positional displacement, when the bone-in limb meat W is pulled up from the holding surface, the gravity center G of the bone-in limb meat W shifts to the outside of a held section. As a result, a rotational moment Mr is generated in the bone-in limb meat W, by which the gravity center G heads outside the holding center Cb with the inclined surfaces 18 as a center, and the held section heads to the back of the pair of clamp pieces.

Each of FIGS. 6A to 6C and FIGS. 7A to 7C shows a closing operation when the pair of clamp pieces 14 hold the bone-in limb meat W. In a process in which the pair of clamp pieces perform the closing operation, the bone-in limb meat W is held by the pair of clamp pieces in a direction in which the gravity center G of the bone-in limb meat W is positioned outside of the held section by the rotational moment Mr. Therefore, the plurality of bone-in limb meats W sequentially held by the pair of clamp pieces are all held in this direction, making it possible to load the plurality of bone-in limb meats to a processing portion such as a deboner all in the same direction.

In an embodiment, when the bone-in limb meat W is the bone-in thigh meat, the bone-in limb meat W is held in a direction in which the knee part N (see FIG. 2) is positioned in the back of the clamp pieces 14a and 14b. In this case, between a right limb and left limb of the bone-in thigh meat, a front surface (inner thigh surface) and a back surface (outer thigh surface) are reversed in direction.

Therefore, when loading the bone-in thigh meat to a processing machine such as a deboner, if the processing machine is a specialized machine capable of processing only the right limb or the left limb, and it is necessary to load the plurality of bone-in limb meats W in the same direction so that a processing step for the plurality of bone-in limb meats W can be performed uniformly, only one of the right limb or the left limb is selected, and sent to the clamping device 10 and the processing machine.

Figure 7A:
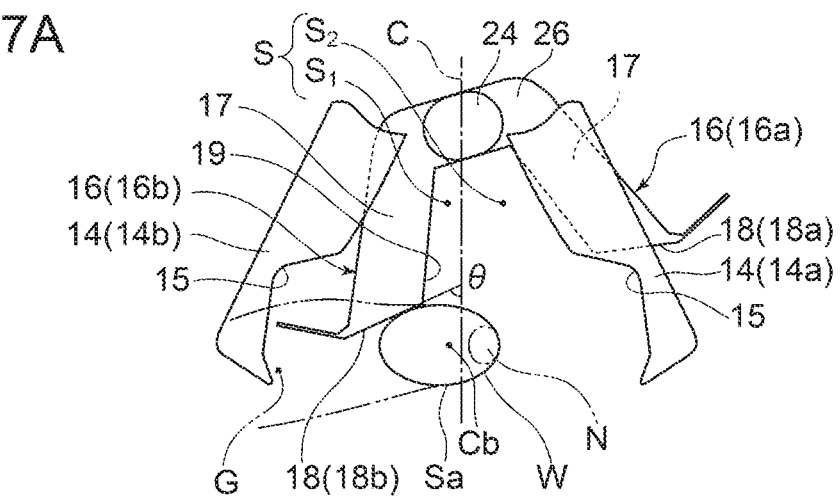
FIG. 7A is an operation explanatory diagram showing the opened state of the clamping device according to an embodiment.

In an embodiment, as shown in FIGS. 3A, 6A, and 7A, at the time of the closing operation of the pair of clamp pieces 14, the space S is formed, the space S being capable of loosely fitting the bone-in limb meat W inside the clamp pieces. As a result, a rotational operation of the bone-in limb meat W by the rotational moment Mr is allowed.

In an embodiment, a drive portion 13 for performing an opening/closing operation of the pair of clamp pieces 14 is disposed inside the base portion 12. The drive portion 13 is constituted of, for example, an air cylinder.

Figure 6B:
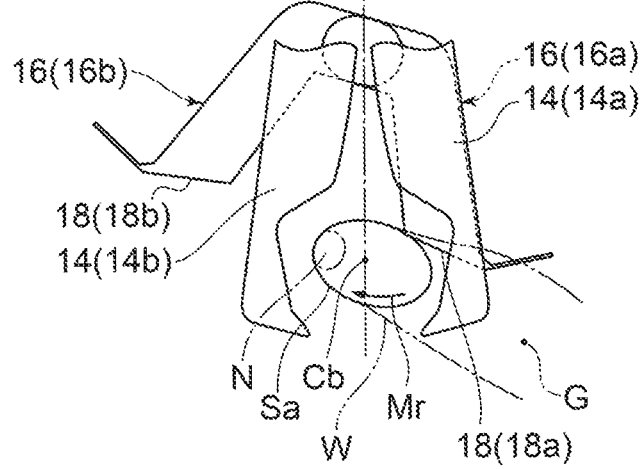
FIG. 6B is an operation explanatory diagram showing a state in which the closing operation of the clamping device further proceeds according to an embodiment.
Figure 6C:
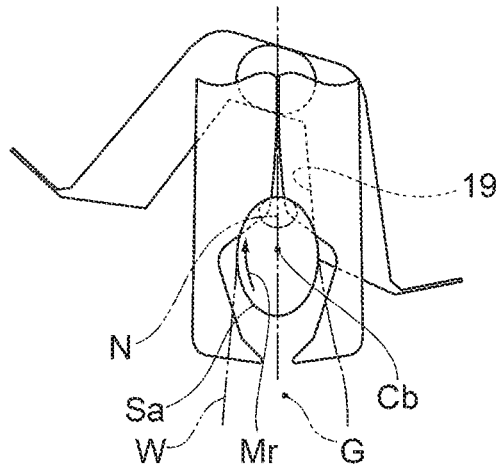
FIG. 6C is an operation explanatory diagram showing a state in which the clamping device is closed according to an embodiment.
Figure 7B:
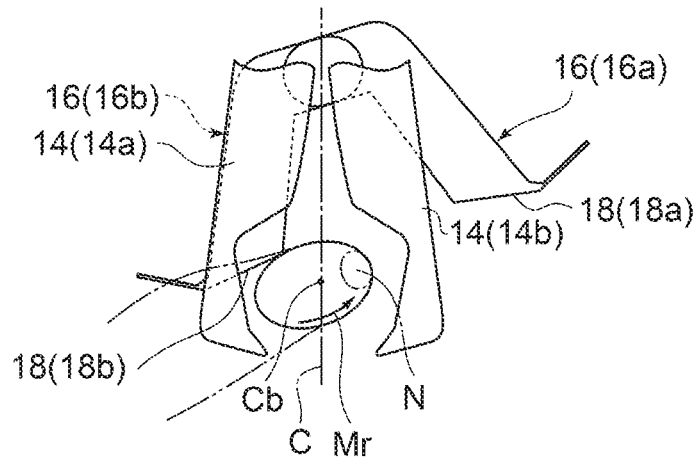
FIG. 7B is an operation explanatory diagram showing a state immediately before the closed state of the clamping device according to an embodiment.
Figure 7C:
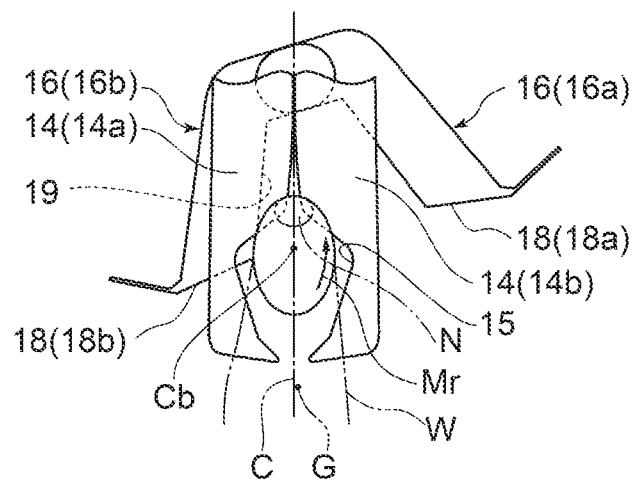
FIG. 7C is an operation explanatory diagram showing a state in which the clamping device is closed according to an embodiment.

In an embodiment, as shown in FIGS. 3B, 6C, and 7C, when the pair of clamp pieces 14 are in the closed state, the orientation adjusting members 16 have, in the planar view, a restraint surface 19 which exists at a position overlapping the space S.

As shown in FIGS. 6A and 7A, the space S is divided into a first space $S_1$ and a second space $S_2$ by the center line C, the first space $S_1$ being positioned on the side of the orientation adjusting member 16 and the second space $S_2$ being positioned farther away from the orientation adjusting member 16 than the first space $S_1$, and the restraint surface 19 exists at a position overlapping the first space $S_1$ in the planar view.

According to the present embodiment, when the pair of clamp pieces are in the closed state, the restraint surface 19 can prevent the bone-in limb meat W from dropping off the clamp pieces, making it possible to maintain a holding state by the pair of clamp pieces.

In an embodiment, as shown in FIG. 3A, an inner surface 15 of the clamp piece positioned away from the orientation adjusting members 16 of the pair of clamp pieces 14 forms a concave surface, the inner surface 15 facing the bone-in limb meat W.

According to the present embodiment, the inner surface 15 forms the concave surface, allowing the bone-in limb meat W in which the rotational moment Mr is generated to smoothly perform the rotational operation while being guided by the concave surface.

In an embodiment, as shown in FIGS. 1 and 3A, tip portions of the pair of clamp pieces 14 respectively have inner surfaces 20a and 20b facing each other across the space S. As shown in FIG. 3B, when the pair of clamp pieces 14 are in the closed state, the inner surfaces 20a and 20b incline with respect to the center line C so that a distance between the inner surfaces 20a and 20b decreases toward tip sides of the clamp pieces 14.

According to the present embodiment, the tip portions of the pair of clamp pieces 14 each have a taper shape, making it easier to insert the tip portions of the respective clamp pieces under the held section of the bone-in limb meat W at the time of the closing operation of the pair of clamp pieces 14.

In an embodiment, as shown in FIG. 1, the orientation adjusting members 16 are rotatably supported to the base portion 12 in the opening/closing direction (the direction of the arrow "a") of the pair of clamp pieces 14 and include a drive portion 22 rotating the orientation adjusting members 16.

According to the present embodiment, when the pair of clamp pieces perform a holding operation, it is possible to adjust a timing at which the inclined surfaces 18 of the orientation adjusting members 16 contact the bone-in limb meat W. Thus it is possible to perform, at an optimum timing, the rotational operation of the bone-in limb meat W by the rotational moment Mr with respect to the holding operation of the clamp pieces.

In an embodiment, as shown in FIG. 1, the orientation adjusting members 16 are rotatably mounted to the base portion 12 via a support shaft 24. In an embodiment, the support shaft 24 is disposed in the base portion 12 on the center line C.

In an embodiment, the drive portion 22 is constituted of an air cylinder.

In an embodiment, as shown in FIG. 1, when the pair of clamp pieces 14 are holding the bone-in limb meat W, the inclined surfaces 18 of the orientation adjusting members 16 are configured to be positioned above the respective clamp pieces.

In general, the gravity center G of the bone-in limb meat W exists in a meat part positioned below the holding position by the clamp pieces.

According to the present embodiment, the inclined surfaces 18 of the orientation adjusting members 16 are positioned above the clamp pieces, making it possible to bring the inclined surfaces 18 into contact with a bone part on a tip side of the bone-in limb meat W. It is possible to securely generate, in the bone-in limb meat W, the rotational moment Mr about the inclined surfaces 18 by bringing the inclined surfaces 18 into contact with the hard bone part and setting the hard bone part to a rotational center.

In an embodiment, as shown in FIG. 1, the inclined surfaces 18 extend along a direction (the direction of the arrow b) perpendicular to a plane including the opening/closing direction (the direction of the arrow "a") of the clamp pieces. Consequently, it is possible to increase a contact area with the bone-in limb meat W and stably contact the bone-in limb meat W.

Each inclined surface 18 may be a flat surface or may be a concave surface according to a curve on the surface of the bone-in limb meat W.

Figure 4:
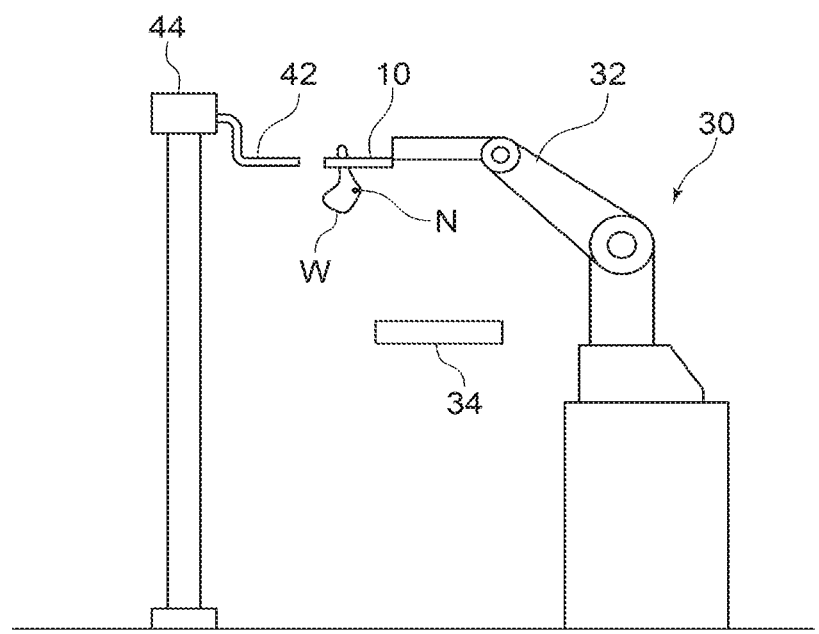
FIG. 4 is a side view of a loading device according to an embodiment.
Figure 5:
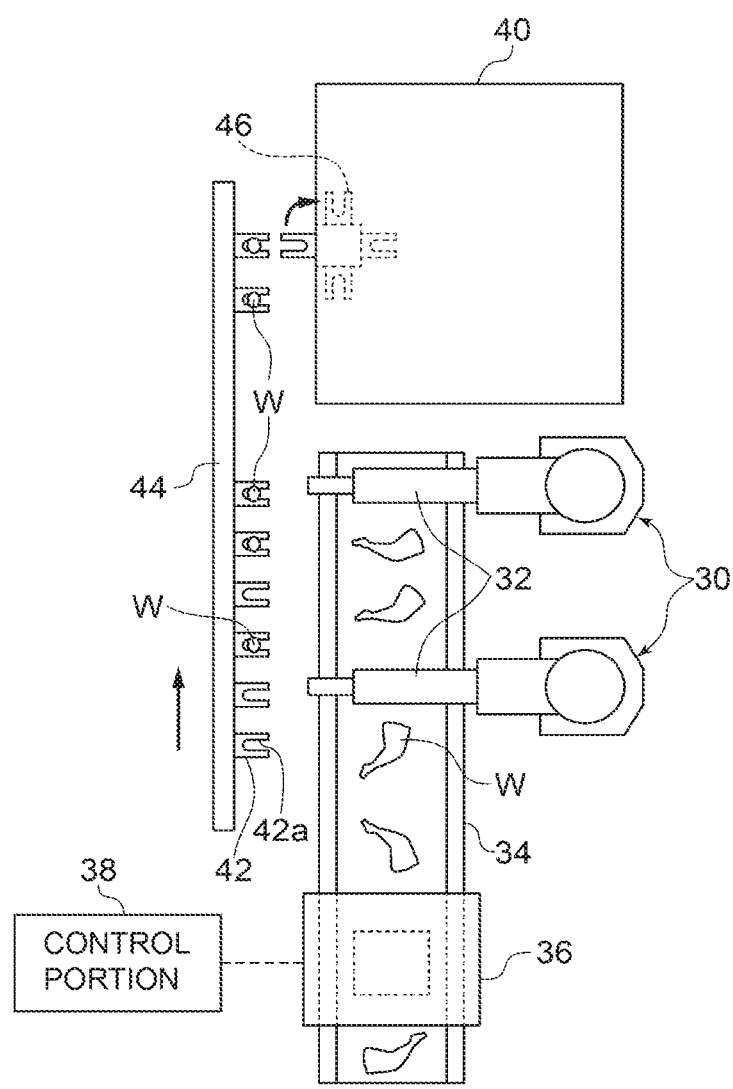
FIG. 5 is a planar view of the loading device according to an embodiment.

As shown in FIGS. 4 and 5, each loading device 30 for the bone-in limb meat W according to an embodiment is a loading device for loading the bone-in limb meat W to a processing portion 40. The loading device 30 includes an arm 32 where the clamping device 10 is mounted. The arm 32 is configured to support the base portion 12, and be able to control the position and orientation of the base portion 12.

The loading device 30 loads the bone-in limb meat W held by the clamping device 10 to the processing portion 40.

With the above configuration, the arm 32 can control the base portion 12 at an arbitrary position and orientation, making it possible to move the clamping device 10 in accordance with the bone-in limb meat W at the arbitrary position and orientation, and hold the bone-in limb meat W by the clamping device 10.

In addition, the arm 32 includes the clamping device 10, resulting in holding the plurality of bone-in limb meats W all in the same direction, the bone-in limb meats W being sequentially held by the clamping device 10 as described above. It is therefore possible to load the plurality of bone-in limb meats held by the clamping device 10 to the processing portion 40 in the same direction.

In an embodiment, as shown in FIG. 5, each arm 32 is formed as a multi-axes articulated arm, and can operate the base portion 12 at an arbitrary position and orientation.

In an embodiment, the processing portion 40 is a deboner which separates the bone-in limb meat W into the bone part and the meat part.

In an embodiment, as shown in FIG. 5, a conveyor 34 is provided, which conveys the bone-in limb meats W to the clamping device 10, and a determination portion 36 is provided, which can acquire orientation information of the bone-in limb meats W conveyed by the conveyor 34. A control portion 38 operates each arm 32 based on the orientation information obtained by the determination portion 36 and operates to be able to load the bone-in limb meats W to the processing portion 40 in a predetermined direction.

According to the present embodiment, each arm 32 is operated based on the orientation information acquired by the determination portion 36, making it possible to hold each bone-in limb meat W sent on the conveyor 34 at an arbitrary position and orientation, and load the bone-in limb meat W held by the clamping device 10 to the processing portion 40 in the predetermined direction. It is also possible to continuously load the plurality of bone-in limb meats W conveyed by the conveyor 34 to the processing portion 40, and thus to increase a speed at which the bone-in limb meats are loaded to the processing portion 40 and cope with a deboner having a high processing speed.

In an embodiment, the determination portion 36 includes an image capturing portion and an image processing portion. The image capturing portion captures images of the bone-in limb meats W on a conveyance surface of the conveyor 34, and the image processing portion obtains information about the positions and orientations of the bone-in limb meats W from the images of the bone-in limb meats W captured by the image capturing portion.

In an embodiment, when the bone-in limb meat W is, for example, the bone-in thigh meat, the above orientation information includes front/back surface information indicating whether the upper surface of each bone-in limb meat W placed on the conveyor 34 is a front surface or a back surface. In addition, as shown in FIG. 1, the orientation adjusting members 16 are rotatably supported to the base portion 12 in the opening/closing direction of the pair of clamp pieces. The clamping device 10 includes the drive portion 22 capable of rotating the orientation adjusting members 16.

Based on the above front/back surface information, the control portion 38 controls the drive portion 22 to rotate the orientation adjusting members 16 such that the inclined surfaces 18 are positioned on the same side as the gravity center G of the bone-in limb meat W with respect to the holding center Cb as shown in FIGS. 3A, 6A, and 7A when the pair of clamp pieces 14 hold the bone-in limb meat W.

According to the present embodiment, even if each bone-in limb meat W placed on the conveyor 34 is the bone-in thigh meat, and the upper surface of the bone-in thigh meat is the front surface or the back surface, the inclined surfaces 18 are always positioned on the same side as the gravity center G of the bone-in limb meat W with respect to the holding center Cb, making it possible to securely generate the rotational moment Mr.

In addition, the direction of the rotational moment Mr is set in a direction in which a gravity-center side of the bone-in limb meat always rotates to a side closer to the tip sides of the clamp pieces than the holding position of the pair of clamp pieces, allowing the clamping device 10 to always hold the plurality of bone-in limb meats W in the same direction. Thus it is possible to load the plurality of bone-in limb meats W to the processing portion 40 in the same direction.

In an embodiment, as shown in FIG. 1, the orientation adjusting members 16 (16a and 16b) include a mounting portion 26 mounted to the arm 32, and a pair of extension portions 17 extending while being forked from the mounting portion 26 and having the inclined surfaces 18 (18a and 18b). The control portion 38 controls the drive portion 22 to dispose a first extension portion of the pair of extension portions 17 such that the first extension portion touches the bone-in limb meat W placed on the conveyor 34 when the upper surface of the bone-in limb meat W is the front surface and dispose a second extension portion of the pair of extension portions 17 such that the second extension portion touches the bone-in limb meat when the upper surface of the bone-in limb meat is the back surface.

FIGS. 6A to 6C show the operation of the clamping device 10 when the bone-in limb meat W is the right limb of the bone-in thigh meat and has the front surface as the upper surface, or when the bone-in limb meat is the left limb of the bone-in thigh meat and has the back surface as the upper surface.

In this case, the inclined surface 18 (18a) contacts the bone-in thigh meat before the clamp piece 14a. The inclined surface 18 (18a) is on the same side as the gravity center G with respect to the holding center Cb, and the rotational moment Mr is generated such that the gravity center G of the bone-in limb meat rotates, about the inclined surface 18 (18a), to a side closer to the tip sides of the clamp pieces than the holding center Cb of the pair of clamp pieces. As a result, the bone-in thigh meat is held in a direction in which the knee part N is positioned in the back of the clamp pieces.

FIGS. 7A to 7C show the operation of the clamping device 10 when the bone-in limb meat W is the right limb of the bone-in thigh meat and has the back surface as the upper surface, or when the bone-in limb meat W is the left limb of the bone-in thigh meat and has the front surface as the upper surface.

In this case, the inclined surface 18 (18b) contacts the bone-in thigh meat before the clamp piece 14b. The inclined surface 18 (18b) is on the same side as the gravity center G with respect to the holding center Cb, and the rotational moment Mr is generated such that the gravity center G of the bone-in limb meat rotates, about the inclined surface 18 (18b), to the side closer to the tip sides of the clamp pieces than the holding center Cb of the pair of clamp pieces. As a result, the bone-in thigh meat is held in the direction in which the knee part N is positioned in the back of the clamp pieces.

Therefore, when the bone-in limb meat W is the bone-in thigh meat, it is possible to always hold the bone-in thigh meat in the same direction regardless of whether the bone-in thigh meat has the right limb or the left limb, or the front surface or the back surface as the upper surface. It is therefore possible to always load the bone-in limb meat to the processing portions 40 in the same direction.

If the processing portion 40 is a specialized machine only for the right limb or the left limb, the clamping device 10 is to hold one of the right limb or the left limb accordingly. In this case, it is possible to load, in the same direction, not only the bone-in thigh meat but also the front/back surface to the processing portion 40. Therefore, a processing step such as deboning for the bone-in thigh meat is automated easily.

In an embodiment, as shown in FIG. 5, a plurality of hangers 42 capable of suspending the bone-in limb meats W are disposed. Each of the hangers 42 includes a concave part 42a capable of inserting and thereby suspending a corresponding one of the bone-in limb meats W. Because the clamping device 10 holds the plurality of bone-in limb meats in the same direction, the control portion 38 can suspend the respective bone-in limb meats to the plurality of hangers 42 in the same direction by controlling operations of the arms 32.

If the bone-in limb meat W is the bone-in thigh meat shown in FIGS. 6A to 6C and FIGS. 7A to 7C, it is possible to suspend the bone-in thigh meats to the plurality of hangers 42 in the same direction such that the knee parts N face outward of the hangers 42.

The hangers 42 to which the bone-in limb meats W are suspended by the clamping device 10 are moved in an arrow direction by a conveyor 44 and reach the processing portion 40, loading the bone-in limb meats to the processing portion 40.

In an embodiment, a loading portion 46 is disposed at an entrance of the processing portion 40. Each bone-in limb meat W is transferred from a corresponding one of the hangers 42 to the loading portion 46 and supplied from the loading portion 46 to the processing portion 40.

In an embodiment, as shown in FIG. 5, the plurality of loading devices 30 are disposed along a conveyance direction of the conveyor 34. It is possible to increase a moving speed of the hangers 42, and thus to increase the speed at which the bone-in limb meats W are loaded to the processing portion 40 by suspending the bone-in limb meats W from the plurality of loading devices 30 to the hangers 42. For example, as illustrated, the two loading devices 30 are disposed so as to suspend the bone-in limb meats to the plurality of hangers 42 alternately.

Figure 8:
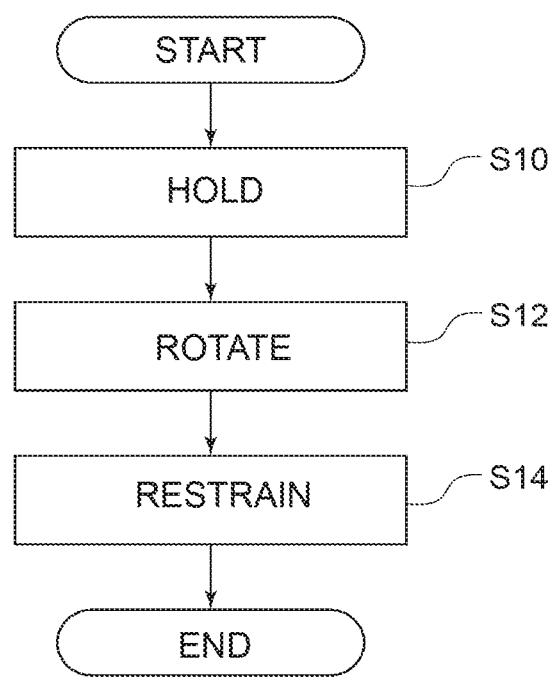
FIG. 8 is a flowchart of a clamping method according to an embodiment.

A clamping method for the bone-in limb meat W according to an embodiment is a method of clamping the bone-in limb meat by using the clamping device 10 and will be described below with reference to FIG. 8.

First, the pair of clamp pieces 14 are closed to hold the bone-in limb meat W (holding step S10).

During the closing operation of the pair of clamp piece, the inclined surfaces 18 of the orientation adjusting members 16 are brought into contact with the bone-in limb meat W, and the held section of the bone-in limb meat W held by the pair of clamp pieces is rotated, about the inclined surfaces 18, to the back of the pair of clamp pieces (rotating step S12).

According to the above method, in the rotating step S12, during the closing operation of the pair of clamp pieces, the inclined surfaces 18 of the orientation adjusting members 16 are brought into contact with the bone-in limb meat W, and the bone-in limb meat W is rotated, about the inclined surfaces 18, to the back of the pair of clamp pieces, and thus the plurality of bone-in limb meats W sequentially held by the clamping device 10 are rotated and held in the same direction.

It is therefore possible to load the plurality of bone-in limb meats W to the processing portion 40 in the same direction, the bone-in limb meats W being sequentially held by the clamping device 10 in the same direction.

In an embodiment, after the pair of clamp pieces 14 are closed, in the planar view, a part of the orientation adjusting members 16 is disposed so as to overlap the space S formed between the pair of clamp pieces, thereby restraining the bone-in limb meat W. (restraining step S14).

According to the present embodiment, the part of the orientation adjusting members 16 is disposed so as to overlap the space S, and thus the bone-in limb meat W is restrained at the holding position by the orientation adjusting members 16. Thus it is possible to prevent the bone-in limb meat W held by the pair of clamp pieces from dropping off the clamp pieces and maintain a holding state by the clamp pieces.

In an embodiment, in the rotating step S12, the inclined surfaces 18 of the orientation adjusting members 16 are brought into contact with the bone-in limb meat on the same side as the gravity center G of the bone-in limb meat W with respect to the holding center Cb of the bone-in limb meat W held by the pair of clamp pieces 14.

According to the present embodiment, the inclined surfaces 18 of the orientation adjusting members 16 are positioned on the same side as the gravity center G of the bone-in limb meat W with respect to the holding center Cb, making it possible to securely generate the rotational moment Mr.

Moreover, the rotational moment Mr is generated in a direction such that the gravity center G of the bone-in limb meat W always rotates to a side closer to tips of the clamp pieces than the held section of the pair of clamp pieces. Thus it is possible to always hold the plurality of bone-in limb meats W in the same direction and to load the plurality of bone-in limb meats to the processing portion 40 in the same direction.

In an embodiment, in the rotating step S12, when the pair of clamp pieces 14 perform the closing operation, a part of the bone-in limb meat W is raised by the pair of clamp pieces so that positional displacement occurs between the gravity center G of the bone-in limb meat W and the holding center Cb of the bone-in limb meat W held by the pair of clamp pieces, and the rotational moment toward the back of the pair of clamp pieces about the inclined surfaces 18 is generated in the bone-in limb meat W.

According to the present embodiment, the rotational moment Mr toward the back of the pair of clamp pieces about the inclined surfaces 18 is generated in the bone-in limb meat W, making it possible to always hold the bone-in limb meat W in the same direction.

In an embodiment, the bone-in limb meat W is the bone-in thigh meat and in the rotating step S12, the inclined surfaces 18 of the orientation adjusting members 16 are brought into contact with the bone-in thigh meat at a position between a limb neck and the held section held by the pair of clamp pieces.

According to the present embodiment, the inclined surfaces 18 can be brought into contact with a hard section on a limb neck side of the bone-in thigh meat, making it possible to securely generate the rotational moment Mr about the inclined surfaces 18.

INDUSTRIAL APPLICABILITY

According to an embodiment, when loading a bone-in limb meat to a processing device such as a deboner, it is possible to sequentially hold a plurality of bone-in limb meats by a clamping device in the same direction, making it possible to automatically load the bone-in limb meats in the same direction without manpower.

REFERENCE SIGNS LIST

10 Clamping device
12 Base portion
13, 22 Drive portion
14 (14a, 14b) Clamp piece
15, 20a, 20b Inner surface
16 (16a, 16b) Orientation adjusting member
17 Extension portion
18 (18a, 18b) Inclined surface
19 Restraint surface
24 Support shaft
26 Mounting portion
30 Loading device
32 Arm
34, 44 Conveyor
36 Determination portion
38 Control portion
40 Processing portion
42 Hanger
42a Concave part
46 Loading portion
A Contact position
B Holding position
C Center line
Cb Holding center
G Gravity center
Mr Rotational moment
N Knee part
S Space
$S_1$ First space
$S_2$ Second space
W bone-in limb meat
f Limb neck part

The invention claimed is:

1. A clamping device for a bone-in limb meat comprising:
    a base portion;
    a pair of clamp pieces mounted to the base portion and configured to hold a bone-in limb meat; and
    an orientation adjusting member for adjusting an orientation of the bone-in limb meat, the orientation adjusting member being mounted to the base portion independently of the pair of clamp pieces and having an inclined surface inclined at an acute angle with respect to a center line between the pair of clamp pieces,
    wherein when the pair of clamp pieces are in an opened state, in a planar view, at least a part of the inclined surface of the orientation adjusting member is disposed so as to overlap a space formed between the pair of clamp pieces.

2. The clamping device for the bone-in limb meat according to claim 1,
    wherein when the pair of clamp pieces are in a closed state, in the planar view, the orientation adjusting member has a restraint surface present at a position overlapping the space between the pair of clamp pieces and capable of restraining the bone-in limb meat,
    wherein the space is divided into a first space and a second space by the center line, the first space being positioned on a side of the orientation adjusting member, and the second space being at a position farther away from the orientation adjusting member than the first space, and
    wherein the restraint surface exists at a position overlapping the first space in the planar view.

3. The clamping device for the bone-in limb meat according to claim 1,
    wherein an inner surface of a clamp piece of the pair of clamp pieces at a position away from the orientation adjusting member forms a concave surface, the inner surface facing the bone-in limb meat.

4. The clamping device for the bone-in limb meat according to claim 1,
    wherein tip portions of the pair of clamp pieces respectively have inner surfaces facing each other across the space, and when the pair of clamp pieces are in a closed state, the inner surfaces of the pair of clamp pieces incline with respect to the center line such that a distance between the inner surfaces decreases toward tip sides of the clamp pieces.

5. The clamping device for the bone-in limb meat according to claim 1,
    wherein the orientation adjusting member is rotatably supported to the base portion in an opening/closing direction of the pair of clamp pieces, and
    wherein the clamping device includes a drive portion capable of rotating the orientation adjusting member.

6. The clamping device for the bone-in limb meat according to claim 1,
    wherein the inclined surface of the orientation adjusting member is configured to be positioned above the pair of clamp pieces when the pair of clamp pieces are holding the bone-in limb meat.

7. A loading device for a bone-in limb meat for loading the bone-in limb meat to a processing portion, the loading device comprising:
    the clamping device for the bone-in limb meat according to claim 1; and
    an arm supporting the base portion, and capable of controlling a position and orientation of the base portion,
    wherein the loading device loads, to the processing portion, the bone-in limb meat held by the clamping device.

8. The loading device for the bone-in limb meat according to claim 7, further comprising:
    a conveyor conveying the bone-in limb meat to the clamping device;
    a determination portion capable of acquiring orientation information of the bone-in limb meat conveyed by the conveyor; and
    a control portion operating the arm based on the orientation information obtained by the determination portion and loading the bone-in limb meat to the processing portion in a predetermined direction.

9. The loading device for the bone-in limb meat according to claim 8,
    wherein the bone-in limb meat is a bone-in thigh meat, and the orientation information includes front/back surface information indicating whether an upper surface of the bone-in limb meat placed on the conveyor is a front surface or a back surface,
    wherein the orientation adjusting member is rotatably supported to the base portion in an opening/closing direction of the pair of clamp pieces,
    wherein the clamping device includes a drive portion capable of rotating the orientation adjusting member, and
    wherein the control portion is configured to control, based on the front/back surface information, the drive portion such that the inclined surface is positioned on a same side as a gravity center of the bone-in limb meat with respect to a center of a held section of the bone-in limb meat when the pair of clamp pieces hold the bone-in limb meat.

10. The loading device for the bone-in limb meat according to claim 9,
wherein the orientation adjusting member includes:
a mounting portion mounted to the arm; and
a pair of extension portions extending while being forked from the mounting portion and each having the inclined surface, and
wherein the control portion is configured to dispose a first extension portion of the pair of extension portions such that the first extension portion touches the bone-in limb meat when the upper surface of the bone-in limb meat placed on the conveyor is the front surface and dispose a second extension portion of the pair of extension portions such that the second extension portion touches the bone-in limb meat when the upper surface of the bone-in limb meat is the back surface.

11. A clamping method for clamping a bone-in limb meat by using a clamping device, the clamping device including: a base portion; a pair of clamp pieces mounted to the base portion; and an orientation adjusting member mounted to the base portion independently of the pair of clamp pieces and having an inclined surface inclined at an acute angle with respect to a center line between the pair of clamp pieces, the clamping method comprising:
a holding step of holding the bone-in limb meat by closing the pair of clamp pieces; and
a rotating step of bringing the inclined surface of the orientation adjusting member into contact with the bone-in limb meat and rotating, about the inclined surface, a held section of the bone-in limb meat held by the pair of clamp pieces to a back of the pair of clamp pieces during an closing operation of the pair of clamp pieces.

12. The clamping method for the bone-in limb meat according to claim 11, further comprising a restraining step of restraining the bone-in limb meat by disposing a part of the orientation adjusting member so as to overlap a space formed between the pair of clamp pieces in a planar view after the pair of clamp pieces are closed.

13. The clamping method for the bone-in limb meat according to claim 11,
wherein in the rotating step,
the inclined surface of the orientation adjusting member is brought into contact with the bone-in limb meat on a same side as a gravity center of the bone-in limb meat with respect to a center of a held section of the bone-in limb meat held by the pair of clamp pieces.

14. The clamping method for the bone-in limb meat according to claim 11,
wherein in the rotating step,
when the pair of clamp pieces perform the closing operation, a part of the bone-in limb meat is raised by the pair of clamp pieces so that positional displacement occurs between the gravity center of the bone-in limb meat and the center of the held section of the bone-in limb meat held by the pair of clamp pieces, and a rotational moment toward the back of the pair of clamp pieces about the inclined surface is generated in the bone-in limb meat.

15. The clamping method for the bone-in limb meat according to claim 11,
wherein the bone-in limb meat is a bone-in thigh meat, and
wherein in the rotating step,
the inclined surface of the orientation adjusting member is brought into contact with the bone-in thigh meat at a position between a limb neck and the held section.

\* \* \* \* \*